United States Patent
Bienas et al.

(10) Patent No.: US 8,532,605 B2
(45) Date of Patent: Sep. 10, 2013

(54) DETERMINING A RECEIVING QUALITY IN A RADIO COMMUNICATION DEVICE

(75) Inventors: Maik Bienas, Braunschweig (DE); Manfred Zimmermann, Sauerlach (DE); Hyung-Nam Choi, Hamburg (DE); Michael Eckert, Braunschweig (DE)

(73) Assignee: Intel Mobile Communications GmbH, Neubiberg (DE)

( * ) Notice: Subject to any disclaimer, the term of this patent is extended or adjusted under 35 U.S.C. 154(b) by 904 days.

(21) Appl. No.: 11/836,444

(22) Filed: Aug. 9, 2007

(65) Prior Publication Data

US 2009/0042532 A1    Feb. 12, 2009

(51) Int. Cl.
*H04M 11/00* (2006.01)
*H04W 36/00* (2009.01)
*H04W 4/00* (2009.01)
*H04L 12/26* (2006.01)

(52) U.S. Cl.
USPC ............ 455/403; 370/328; 370/252; 455/439

(58) Field of Classification Search
USPC ..................... 455/403, 439; 370/252, 328
See application file for complete search history.

(56) References Cited

U.S. PATENT DOCUMENTS

| 5,966,657 | A * | 10/1999 | Sporre .......................... 455/425 |
| 6,990,324 | B2 | 1/2006 | Laroia et al. |
| 7,593,367 | B2 | 9/2009 | Amerga et al. |
| 2003/0137955 | A1 | 7/2003 | Kim et al. |
| 2003/0223354 | A1 | 12/2003 | Olszewski |
| 2005/0143084 | A1 * | 6/2005 | Cheng et al. ................ 455/452.2 |
| 2007/0026808 | A1 * | 2/2007 | Love et al. .................... 455/67.7 |
| 2007/0026810 | A1 * | 2/2007 | Love et al. .................... 455/67.11 |
| 2007/0244696 | A1 * | 10/2007 | Hara et al. ...................... 704/201 |
| 2010/0091693 | A1 * | 4/2010 | Pelletier et al. ................ 370/311 |

FOREIGN PATENT DOCUMENTS

| EP | 1 499 059 A1 | 1/2005 |
| EP | 1 750 399 A1 | 2/2007 |
| JP | 2001-244911 A | 9/2001 |

(Continued)

OTHER PUBLICATIONS

3GPP TS 36.300 V8.1.0 (Jun. 2007); *Technical Specification*; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8).

(Continued)

*Primary Examiner* — Christopher M Brandt
*Assistant Examiner* — Muthuswamy Manoharan
(74) *Attorney, Agent, or Firm* — Schiff Hardin LLP

(57) ABSTRACT

A radio communication device including a receiver configured to receive radio signals, a measurement circuit configured to measure the receiving quality of received radio signals, and a controller configured to control the measurement circuit such that a first measurement is carried out using a first frequency bandwidth, thereby determining a first receiving quality, and if the determined first receiving quality fulfills a first receiving quality criterion, a second measurement is carried out using a second frequency bandwidth, wherein the second frequency bandwidth is larger than the first frequency bandwidth, thereby determining a second receiving quality.

22 Claims, 12 Drawing Sheets

(56) References Cited

FOREIGN PATENT DOCUMENTS

| | | |
|---|---|---|
| JP | 2005-530392 A | 10/2005 |
| JP | 2007-013344 A | 1/2007 |
| KP | 10-2001-0110342 A | 12/2004 |
| KR | 2006-0133108 A | 12/2006 |
| WO | WO-01/78440 A1 | 10/2001 |
| WO | WO-2004/068757 A1 | 8/2004 |
| WO | WO-2005/048467 A2 | 5/2005 |

OTHER PUBLICATIONS

3GPP TS 36.211 V1.1.0 (May 2007); *Technical Specification*; 3rd Generation Partnership Project; Technical Specification Group Radio Access Network; Physical Channels and Modulation (Release 8).

* cited by examiner

FIG 12

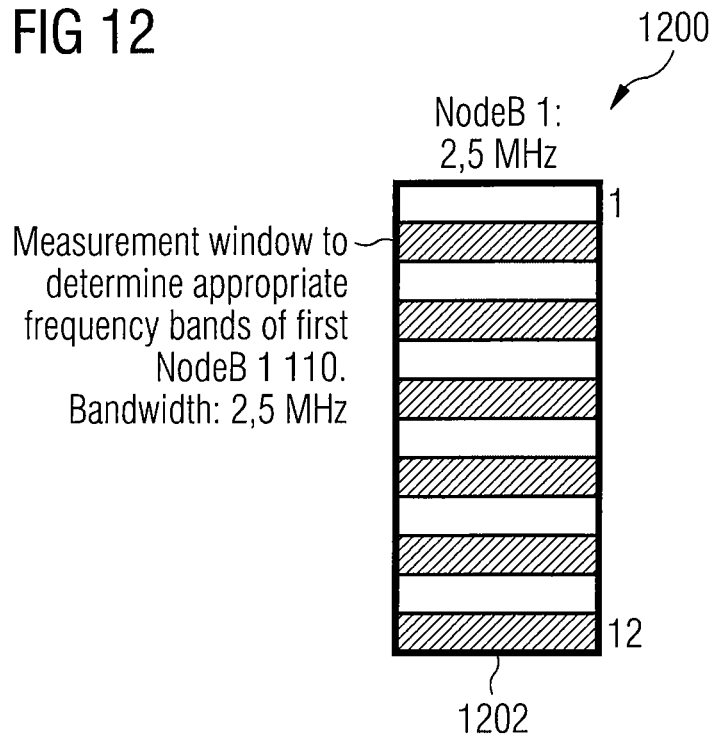

NodeB 1:
2,5 MHz

Measurement window to determine appropriate frequency bands of first NodeB 1 110.
Bandwidth: 2,5 MHz

FIG 13

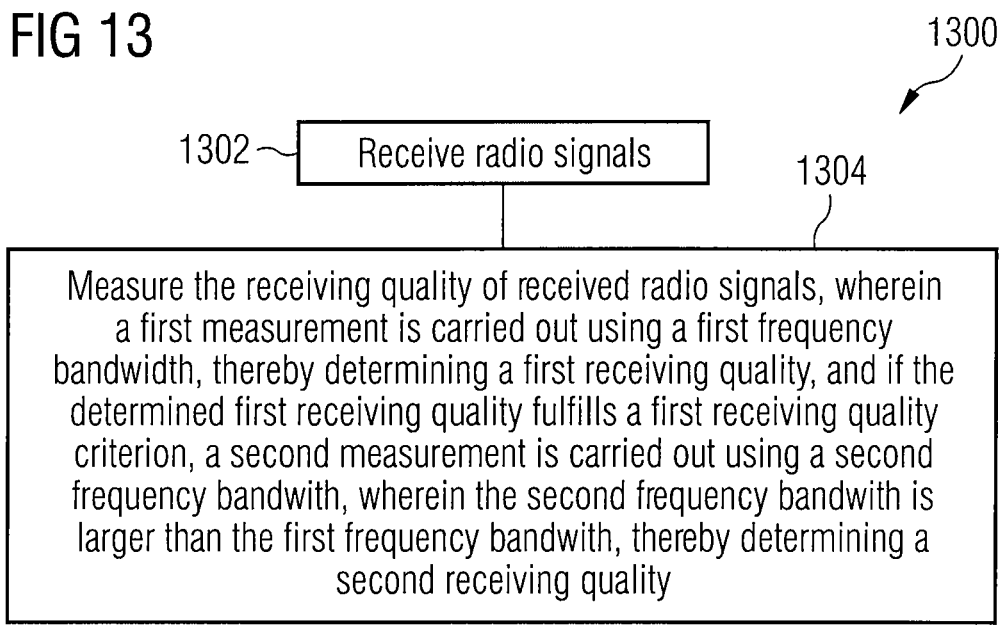

1302 — Receive radio signals

1304 — Measure the receiving quality of received radio signals, wherein a first measurement is carried out using a first frequency bandwidth, thereby determining a first receiving quality, and if the determined first receiving quality fulfills a first receiving quality criterion, a second measurement is carried out using a second frequency bandwith, wherein the second frequency bandwith is larger than the first frequency bandwith, thereby determining a second receiving quality

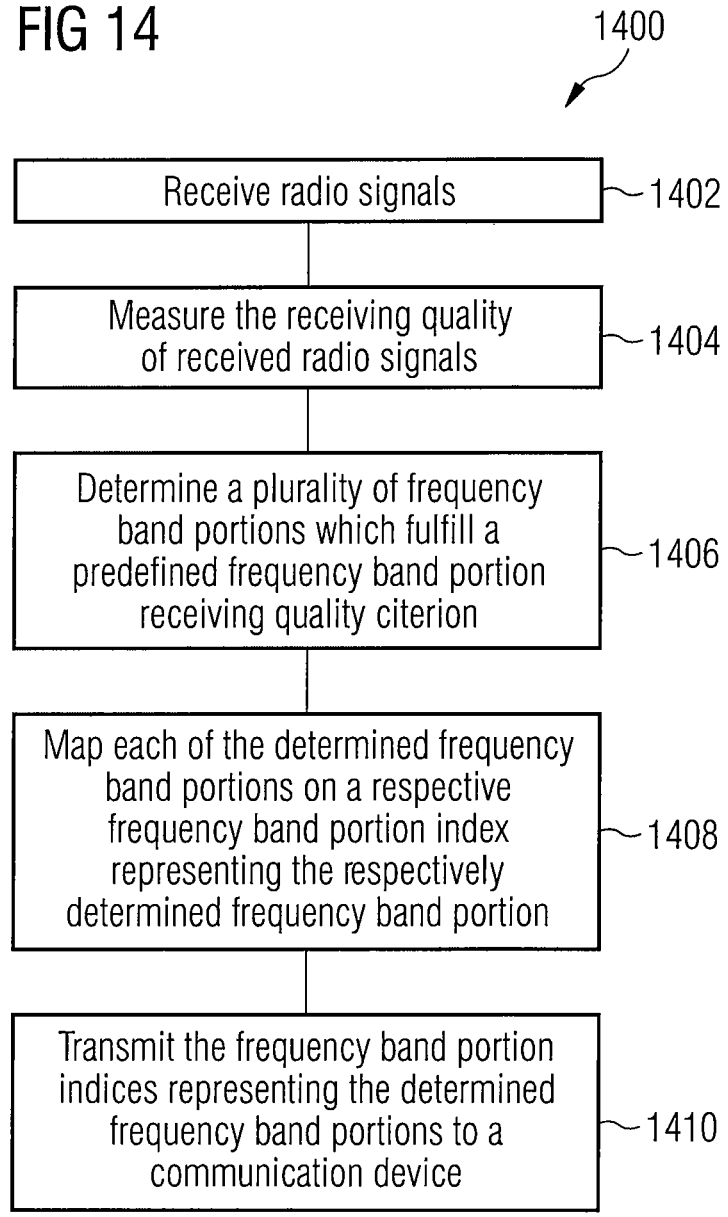

DETERMINING A RECEIVING QUALITY IN A RADIO COMMUNICATION DEVICE

BACKGROUND

Embodiments of the invention relate generally to radio telecommunication devices, a method for determining a receiving quality in a radio communication device, and a method for signalling.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 12 shows a diagram illustrating a receiving window for a measurement in a radio communication device in accordance with an embodiment of the invention;

FIG. 13 shows a message flow diagram of a method for determining a receiving quality in a radio communication device in accordance with an embodiment of the invention; and FIG. 14 shows a message flow diagram of a method for signalling of frequency band measurements in a mobile radio cell in accordance with an embodiment of the invention.

DESCRIPTION

Figure 1:
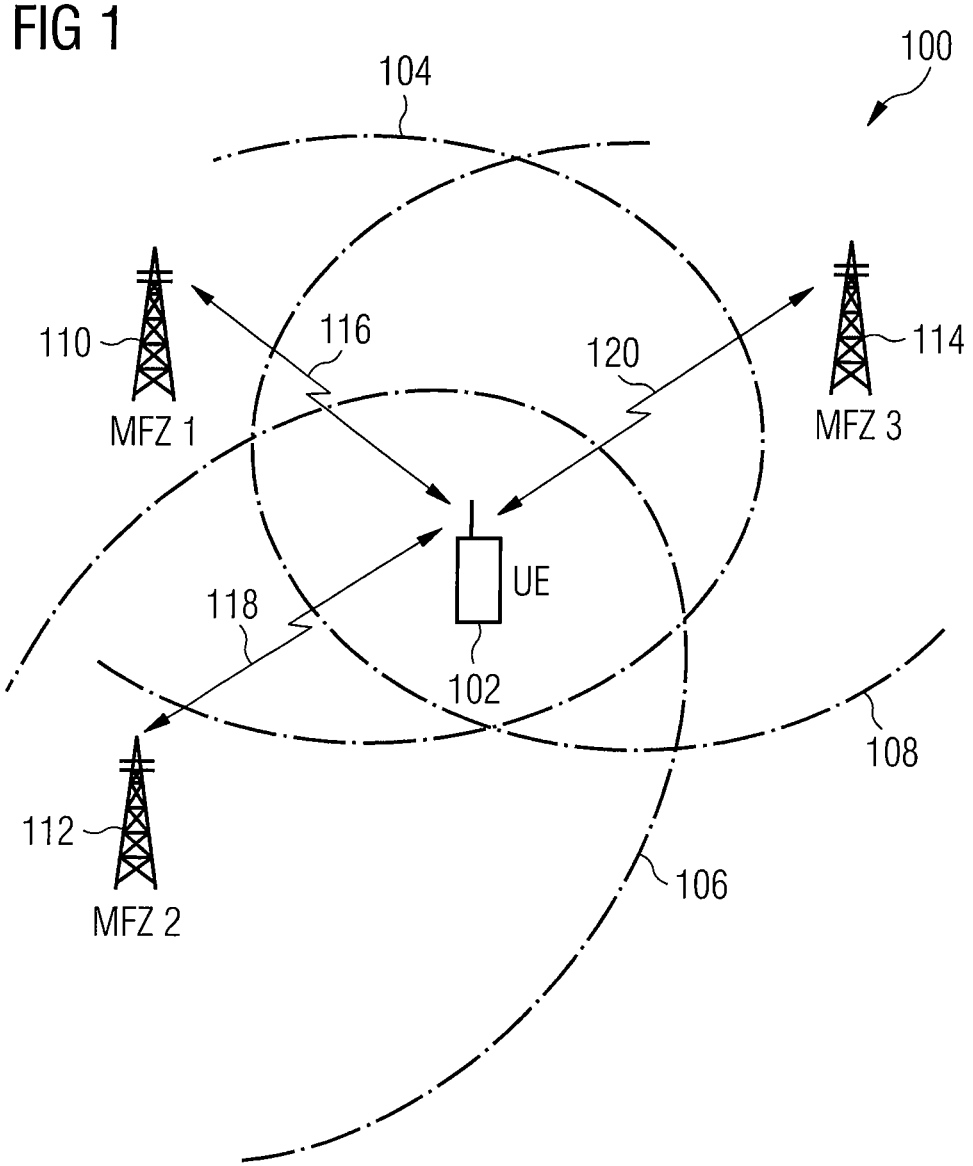
FIG. 1 shows a radio cell arrangement including a radio communication device and a plurality of radio cells in accordance with an embodiment of the invention during the measurement of a receiving quality to determine an appropriate radio cell.

Currently, the mobile radio communication system UMTS (Universal Mobile Telecommunications System) based on W-CDMA (Wideband Code Division Multiple Access) is re-engineered in the standardization group 3GPP (Third Generation Partnership Project). These activities are referred to within 3GPP as LTE (Long Term Evolution). Among other issues, the radio interface is newly developed, wherein in accordance with LTE, multiple access methods are provided such as e.g. OFDMA (Orthogonal Frequency Division Multiple Access) for the transmission of signals in downlink direction (e.g. signal transmission from a respective associated UMTS base station to a mobile radio terminal) and SC-FDMA (Single Carrier Frequency Division Multiple Access) for the transmission of signals in uplink direction (e.g. signal transmission from a mobile radio terminal to a respectively associated UMTS base station). The thus provided radio access network in accordance with LTE is also referred to as E-UTRAN (Evolved UMTS Terrestrial Radio Access Network).

For a certain transition period from a current technology (e.g. GSM (Global System for Mobile Communication) or UMTS) to the introduction of a new technology (e.g. LTE), a plurality of generations of radio interfaces will be operated simultaneously, e.g. GSM, UMTS and LTE. Due to the mobility of the mobile radio user and for performing an efficient radio resource control by means of the radio access network, it is common in the above mentioned mobile radio communication systems that the radio communication terminal device (also referred to as User Equipment (UE) in the following) checks in regular intervals (e.g. by carrying out measurements), from which radio cells signals can currently be received. These measurements are typically carried out by the UE on the basis of a downlink reference signal of the respective radio cell. By way of example, in accordance with UMTS W-CDMA, the measurements of FDD (Frequency Division Duplex) cells are carried out on the basis of the pilot channel P-CPICH (Primary Common Pilot Channel).

Due to the introduction of LTE the task of measuring radio cells becomes more difficult with regard e.g. to the following two aspects:

A further radio interface is introduced, at which measurements have to be carried out in addition to the already existing radio interface measurements. This increases the number of the measurements to be carried out.

Furthermore, LTE radio cells may be operated with scalable bandwidths on different carrier frequencies. The position of the carrier frequency and the used bandwidth are presently not known to the UE at the beginning of a measurement process. Thus, the measurements become more expensive.

During an LTE communication connection, it may e.g. be possible due to the multiple access method OFDMA in the downlink transmission direction, that a communication device such as e.g. a UE, gets assigned for use only a portion of the total available downlink frequency band. The position of the assigned frequency band portions may be assigned dynamically, i.e. the assignment may change during the LTE communication connection. For the assignment of frequency band portions, the current transmission characteristics of the LTE communication connection may be taken into account, for example such that a UE is preferred in getting assigned that frequency band portion which has particularly good transmission characteristics. This method causes further measurements, which may be required during the LTE communication connection in order to be able to determine the position of the frequency band portions having good transmission characteristics.

In an embodiment of the invention, the expression "receiving quality" may be understood as meaning e.g.

the received power of pre-defined signals (e.g. the so called Reference Signal Received Power, RSRP), or a ratio between the received power of pre-defined signals und the noise power received in the same frequency band (e.g. the so called Reference Signal Received Quality, RSRQ).

However, any other suitable characteristic which may represent the quality of the received signal may be used in an alternative embodiment of the invention for a "receiving quality".

FIG. 1 shows a radio cell arrangement 100 including a radio communication terminal device 102 and a plurality of radio cells (e.g. a first mobile radio cell MFZ 1 symbolized by a first borderline 104, a second mobile radio cell MFZ 2 symbolized by a second borderline 106, and a third mobile radio cell MFZ 3 symbolized by a third borderline 108) in accordance with an embodiment of the invention during the measurement of a receiving quality to determine an appropriate radio cell.

It should be understood that the embodiments of the invention are not limited to the mobile radio cell arrangement as shown in FIG. 1 but could be used in any other radio cell arrangement in an alternative embodiment of the invention.

In an embodiment of the invention, each radio cell of the plurality of radio cells 104, 106, 108 includes one or a plurality of base stations (e.g. also referred to as NodeB). Thus, the first radio cell may include one or a plurality of first base stations 110, the second radio cell may include one or a plurality of second base stations 112, and the third radio cell may include one or a plurality of third base stations 114. In an embodiment of the invention, all base stations 110, 112, 114 transmit radio signals into the assigned radio cell 104, 106, 108 in accordance with the respective radio communication standard being used.

In an embodiment of the invention, any suitable radio communication standard, e.g. any suitable mobile radio communication standard may be used in any combination. In an embodiment of the invention, the radio cell arrangement 100 may include communication devices, e.g. communication terminal devices, that are configured in accordance with one or more of the following radio communication standards:

Global System for Mobile Communication (GSM) mobile radio communication standard;

a Third Generation Partnership Project (3GPP) mobile radio communication standard such as e.g. a Universal Mobile Telecommunications System (UMTS) mobile radio communication standard, e.g. a Long Term Evolution (LTE) mobile radio communication standard;

a Code Division Multiple Access (CDMA) mobile radio communication standard;

a Code Division Multiple Access 2000 (CDMA 2000) mobile radio communication standard;

a Freedom of Mobile Multimedia Access (FOMA) mobile radio communication standard.

In an embodiment of the invention, it is assumed that the radio communication terminal device (e.g. the UE 102) is located in a region where it can receive radio signals from all three base stations 110, 112, 114 and thus from all three mobile radio cells 104, 106, 108, shown in FIG. 1. In other words, the radio communication terminal device (e.g. the UE 102) is located in the receiving area of three mobile radio cells.

In an embodiment of the invention, it is assumed that the first base station 110 of the first mobile radio cell 104 and the second base station 112 of the second mobile radio cell 106 transmit signals using a first carrier frequency $f_1$ (in FIG. 1 symbolized by means of a first arrow 116 designating a first communication connection between the first base station 110 of the first mobile radio cell 104 and the communication terminal device (e.g. the UE 102) and by means of a second arrow 118 designating a second communication connection between the second base station 112 of the second mobile radio cell 106 and the communication terminal device (e.g. the UE 102)). In other words, in this embodiment of the invention it is assumed that the first base station 110 and the second base station 112 are base stations of so-called intra-frequency mobile radio cells 104, 106. Furthermore, the third base station 114 of the third mobile radio cell 108 is operated using a second carrier frequency $f_2$, which is different from the first carrier frequency $f_1$ for signal transmission (in FIG. 1 symbolized by means of a third arrow 120 designating a third communication connection between the third base station 114 of the third mobile radio cell 108 and the communication terminal device (e.g. the UE 102)). In this embodiment of the invention, it is assumed that the third base station 114 of the third mobile radio cell 108 is a base station of a so-called inter-frequency mobile radio cell with regard to the first mobile radio cell 104 and the second mobile radio cell 106.

However, it should be understood that in an alternative embodiment of the invention, an arbitrary number of base stations and an arbitrary number of radio cells may be provided, which may transmit signals using any number of different carrier frequencies.

Figure 2:
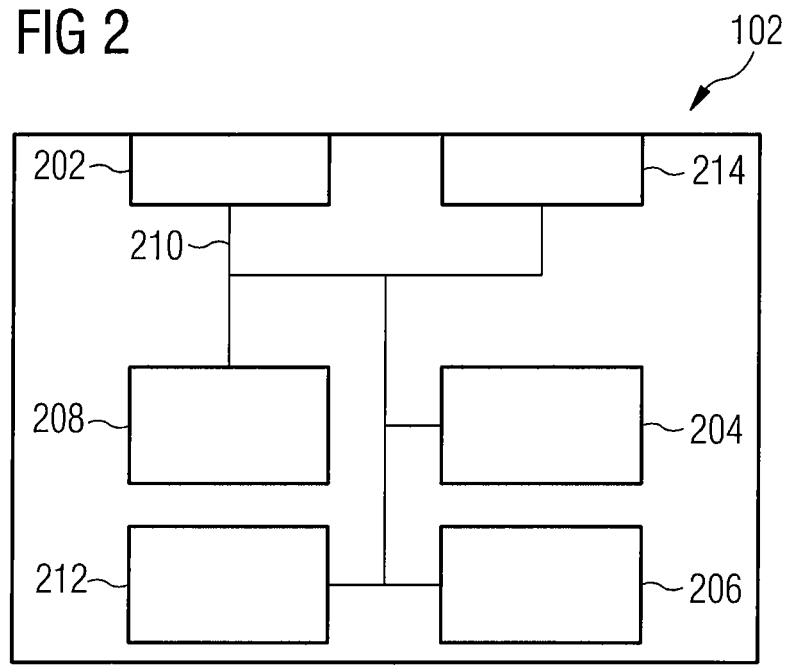
FIG. 2 shows a radio communication terminal device in accordance with an embodiment of the invention.

FIG. 2 shows the radio communication terminal device 102 in accordance with an embodiment of the invention.

In an embodiment of the invention, the radio communication terminal device 102 includes a receiver 202 to receive radio signals, e.g. mobile radio signals, and a measurement circuit 204 to measure the receiving quality of the received radio signals. Furthermore, a controller 206 and a memory 208 are provided. The controller 206 is configured to control the measurement circuit 204 such that a first measurement is carried out using a first frequency bandwidth, thereby determining a first receiving quality and, if the determined first receiving quality fulfills a first receiving quality criterion, a second measurement is carried out using a second frequency bandwidth, wherein the second frequency bandwidth is larger than the first frequency bandwidth, thereby determining a second receiving quality. The memory 208 may include one or a plurality of volatile memories and/or non-volatile memories. In an embodiment of the invention, the program code for the controller 206 may be stored in the memory 208. Alternatively or in addition to that, the data required and generated during the operation of the radio communication terminal device 102 may be stored in the memory 208. The controller 206 may be any kind of control logic, e.g. hard-wired control logic or a programmable control logic. In an embodiment of the invention, the controller 206 may be implemented as a programmable processor such as e.g. as a microprocessor (e.g. including a complex instruction set computer (CISC) processor and/or a reduced instruction set computer (RISC) processor). In addition to the functions described below, the radio communication terminal device 102 is configured to provide all conventional functionalities in mobile radio communication. In an embodiment of the invention, the receiver 202, the measurement circuit 204, the controller 206 and the memory 208 may be connected with each other via an electrical connection 210 such as e.g. a bus interconnection or any other kind of connection such as a cable wiring.

Furthermore, in an embodiment of the invention, the controller 206 may be configured to control the measurement circuit 204 such that the first measurement is carried out for a plurality of radio cells, e.g. for a plurality of mobile radio cells. In an embodiment of the invention, the controller 206 may be configured to control the measurement circuit 204 such that the first measurement is carried out for a plurality of carrier frequencies such that each first measurement is carried out using the first frequency bandwidth around the respective carrier frequency of the plurality of carrier frequencies.

In another embodiment of the invention, the controller 206 may be configured to control the measurement circuit 204 such that if the determined second receiving quality fulfills a second receiving quality criterion, a third measurement is carried out using a third frequency bandwidth, wherein the third frequency bandwidth is larger than the first frequency bandwidth, thereby determining a third receiving quality, and so on.

The radio communication terminal device 102 may be configured as a multi-carrier mobile radio communication device, e.g. as a multi-carrier Frequency Division Multiple Access (FDMA) mobile radio communication device, e.g. as an Orthogonal Frequency Division Multiple Access (OFDMA) mobile radio communication device. In an embodiment of the invention, the radio communication terminal device 102 may be configured in accordance with any of the above-mentioned radio communication standards. By way of example, the radio communication terminal device 102 may be configured as a mobile radio communication device in accordance with a Third Generation Partnership Project communication standard, e.g. as a mobile radio communication device in accordance with a Universal Mobile Telecommunications System communication standard.

Optionally, the radio communication terminal device 102 may further include a determination circuit 212 to determine the first frequency bandwidth. The determination circuit 212 maybe coupled to the other components via the electrical connection 210. In an embodiment of the invention, the determination circuit 212 is configured to determine the first frequency bandwidth using a received bandwidth signalling message, as will be described in more detail below.

As will also be described in more detail below, in an embodiment of the invention, the controller 206 may be configured to control the measurement circuit 204 such that the second measurement is carried out for a plurality of frequency band portions and it is determined how many frequency band portions fulfill a predefined frequency band portion receiving quality criterion. The radio cell from which the radio signals have been received may be evaluated based on how many frequency band portions fulfill the predefined frequency band portion receiving quality criterion.

In an embodiment of the invention, the radio communication terminal device 102 may further include a transmitter 214 to transmit an information about the measurement result to a further communication device. The transmitter 214 may be coupled to the other components via the electrical connection 210.

The further communication device may be a network communication device such as e.g. a mobile radio base station, e.g. a NodeB.

Furthermore, the information about the measurement result may be an index information indicating a radio cell, the measurement result is associated with.

Figure 3:
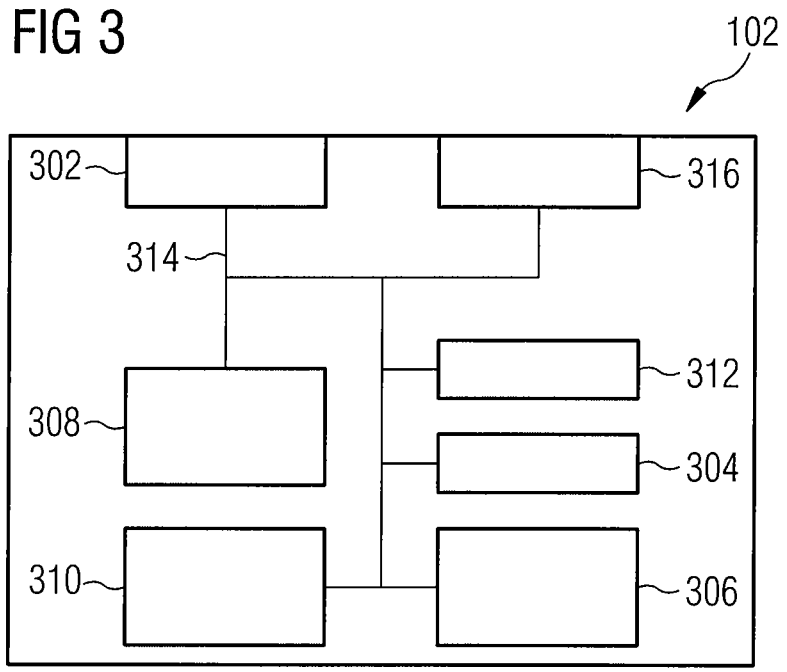
FIG. 3 shows a radio communication terminal device in accordance with another embodiment of the invention.

FIG. 3 shows the radio communication terminal device 102 in accordance with another embodiment of the invention.

In an embodiment of the invention, the radio communication terminal device 102 includes a receiver 302 to receive radio signals, e.g. mobile radio signals, and a measurement circuit 304 to measure the receiving quality of the received radio signals.

In accordance with this embodiment of the invention, the radio communication terminal device 102 may further include a determination circuit 306 to determine a plurality of frequency band portions which fulfill a predefined frequency band portion receiving quality criterion.

Furthermore, a mapping circuit 308 may be provided to map each of the determined frequency band portions on a respective frequency band portion index representing the respectively determined frequency band portion.

Furthermore, a controller 310 and a memory 312 are provided. The controller 310 is configured to control the radio communication terminal device 102 such that the conventional and further described functionalities are provided. The memory 312 may include one or a plurality of volatile memories and/or non-volatile memories. In an embodiment of the invention, the program code for the controller 310 may be stored in the memory 312. Alternatively or in addition to that, the data required and generated during the operation of the radio communication terminal device 102 may be stored in the memory 312. The controller 310 may be any kind of control logic, e.g. hard-wired control logic or a programmable control logic. In an embodiment of the invention, the controller 310 may be implemented as a programmable processor such as e.g. as a microprocessor (e.g. including a complex instruction set computer (CISC) processor and/or a reduced instruction set computer (RISC) processor). In addition to the functions described below, the radio communication terminal device 102 is configured to provide all conventional functionalities in mobile radio communication. In an embodiment of the invention, the receiver 302, the measurement circuit 304, the determination circuit 306, the mapping circuit 308, the controller 310 and the memory 312 may be connected with each other via an electrical connection 314 such as e.g. a bus interconnection or any other kind of connection such as a cable wiring.

In an embodiment of the invention, the radio communication terminal device 102 may further include a transmitter 316 to transmit the frequency band portion indices representing the determined frequency band portions. The transmitter 316 may be coupled to the other components via the electrical connection 314.

The radio communication terminal device 102 may be configured as a multi-carrier mobile radio communication device, e.g. as a multi-carrier Frequency Division Multiple Access (FDMA) mobile radio communication device, e.g. as an Orthogonal Frequency Division Multiple Access (OFDMA) mobile radio communication device. In an embodiment of the invention, the radio communication terminal device 102 may be configured in accordance with any of the above-mentioned radio communication standards. By way of example, the radio communication terminal device 102 may be configured as a mobile radio communication device in accordance with a Third Generation Partnership Project communication standard, e.g. as a mobile radio communication device in accordance with a Universal Mobile Telecommunications System communication standard.

In an embodiment of the invention, the determination circuit 306 may be configured to determine a predetermined number of frequency band portions in which the received radio signals show the highest receiving quality.

In the described embodiments, an UMTS LTE communication system is provided although, in an alternative embodiment of the invention any other multi-carrier radio communication system may be provided.

Figure 4:
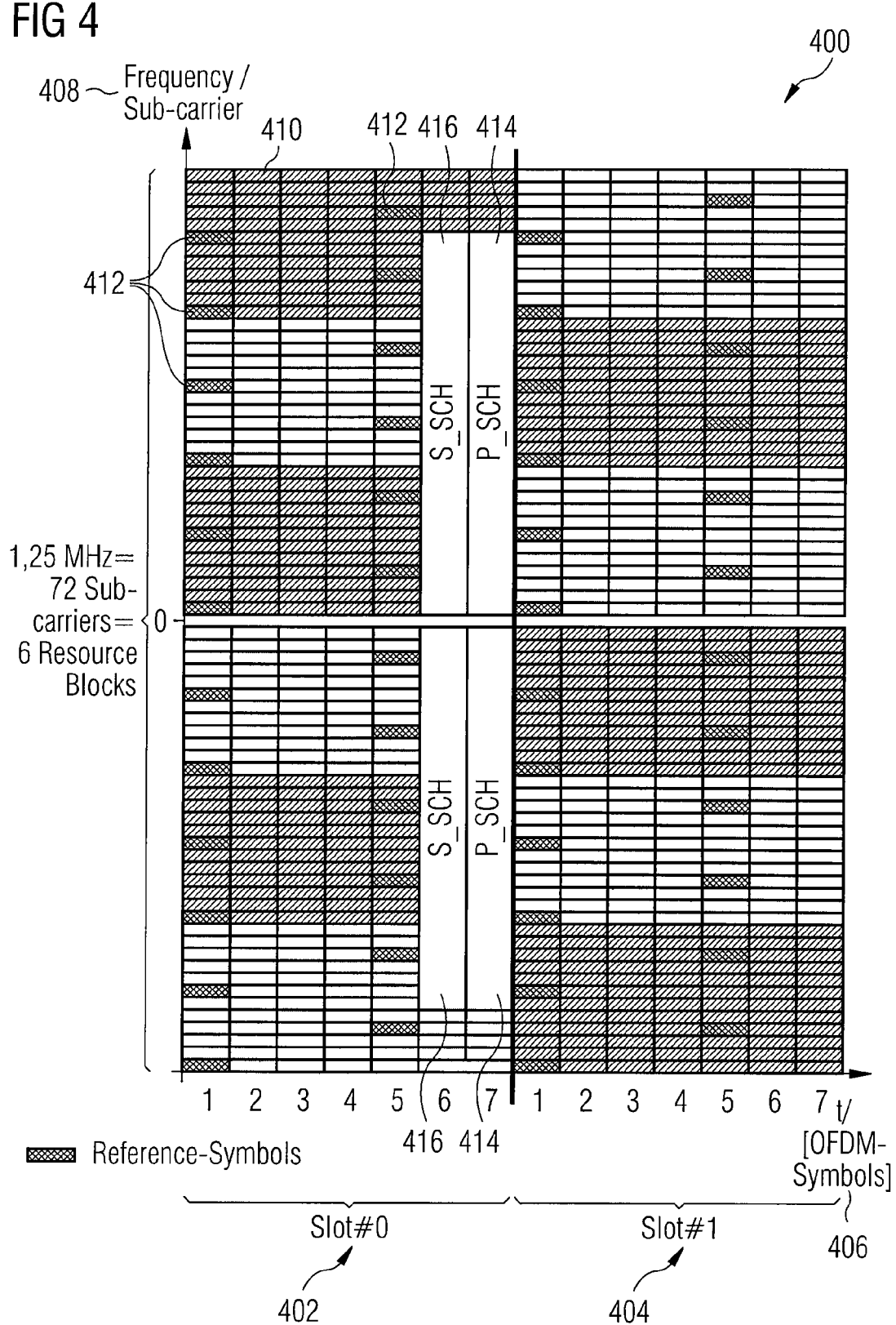
FIG. 4 shows a frame structure of downlink radio signals in accordance with an embodiment of the invention.

FIG. 4 shows a frame structure 400 of downlink radio signals (e.g. LTE downlink radio signals) in accordance with an embodiment of the invention.

The frame structure 400 is shown for the smallest possible bandwidth that is provided in accordance with LTE e.g. of 1.25 MHz for a time period of two time slots (a first time slot (slot #0) 402 and a second time slot (slot #1) 404, for example). The frame structure 400 is shown in a diagram having a time axis 406 (shown in units of OFDM symbols) and a frequency axis 408 (shown in units of sub-carriers). In an embodiment of the invention, seven OFDM symbols are transmitted in each slot 402, 404. Each OFDM symbol may include or consist of 72 sub-carriers 410, which may be arranged symmetrically around the carrier frequency (sub-carrier index 0). The spacing between the sub-carriers 410 may be about 15 kHz. In one embodiment of the invention reference signals are transmitted as follows: On the time axis 406 reference signals are located in each first OFDM symbol and in each fifth OFDM symbol of each slot 402, 404 (which are symbolized in FIG. 4 by means of hatched quadrangles). Furthermore, on the frequency axis 408, reference signals are located in each sixth sub-carrier of these OFDM symbols. Thus, twelve sub-carriers of the 72 sub-carriers are used for reference signals 412. In a communication system providing a higher bandwidth, the number of reference signals is increased correspondingly.

Furthermore, in an embodiment of the invention, synchronization signals 414, 416 are transmitted in the sixth OFDM symbol and in the seventh OFDM symbol of the slot 402 with index #0 (e.g. the Primary Synchronisation CHannel (P-SCH) 414 and the Secondary Synchronisation CHannel (S-SCH) 416), e.g. using the 62 sub-carriers directly adjacent to the carrier frequency. The width and the position of the synchronization signals 414, 416 (in frequency direction) will usually not change even with a higher bandwidth.

In an embodiment of the invention, the arrangement of twelve sub-carriers (e.g. 180 kHz bandwidth) over the duration of one slot (e.g. 0.5 ms) is also referred to as a resource block.

Figure 5:
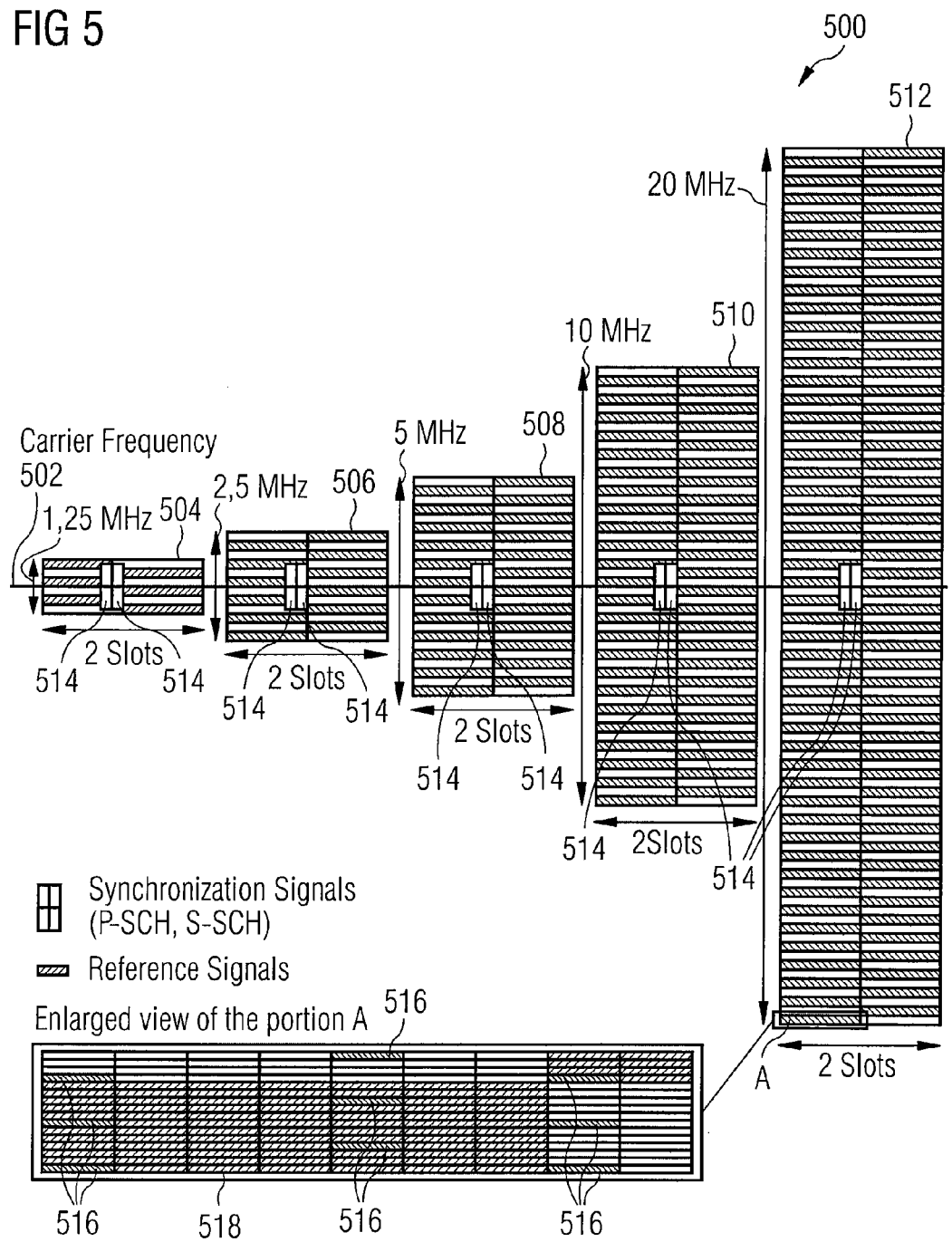
FIG. 5 shows the position of synchronization signals and reference signals in communication systems with scalable bandwidths in accordance with an embodiment of the invention.

In an embodiment of the invention, two signal types are included in the LTE downlink signals, which may be used for the mentioned measurements, namely e.g. the synchronization signals 414, 416 and the reference signals. The synchronization signals 414, 416 may be transmitted in each tenth time slot and are arranged in the six resource blocks around the carrier frequency. The reference signals are included in each resource block. FIG. 5 shows the position of these signals for different communication system bandwidths.

The above described frame structures may be used in all described embodiments of the invention. However, it should be understood that other frame structures with other patterns of synchronization signals and reference signals may be used in an alternative embodiment of the invention. In yet another embodiment of the invention, the used frame structure may include only synchronization signals (and no reference signals) or only reference signals (and no synchronization signals).

FIG. 5 shows the position of synchronization signals and reference signals in communication systems with scalable bandwidths in accordance with an embodiment of the invention in a diagram 500.

In more detail, FIG. 5 shows frame structures for the duration of two time slots. In an embodiment of the invention, a first frame structure 504 for the system bandwidth of 1.25 MHz, a second frame structure 506 for the system bandwidth of 2.5 MHz, a third frame structure 508 for the system bandwidth of 5 MHz, a fourth frame structure 510 for the system bandwidth of 10 MHz, and a fifth frame structure 512 for the system bandwidth of 20 MHz, are provided. The synchronization signals 514 in all the frame structures 504, 506, 508, 510, 512, have the position and bandwidth symmetrical with regard to the carrier frequency 502 independent from the respective communication system bandwidth. FIG. 5 shows the case that all radio cells use the same carrier frequency 502, wherein it should be understood that in an alternative embodiment of the invention, the radio cells may also use different carrier frequencies. The reference signals 516 are equally distributed over the communication system bandwidth. The number of reference signals 516 increases linearly with the communication system bandwidth. The enlarged portion 518 of the fifth frame structure 512 for the system bandwidth of 20 MHz shows the distribution of the reference signals 516. In an embodiment of the invention, the reference signals 516 are distributed over the entire system bandwidth of the respective communication system in accordance with the shown pattern.

Figure 6:
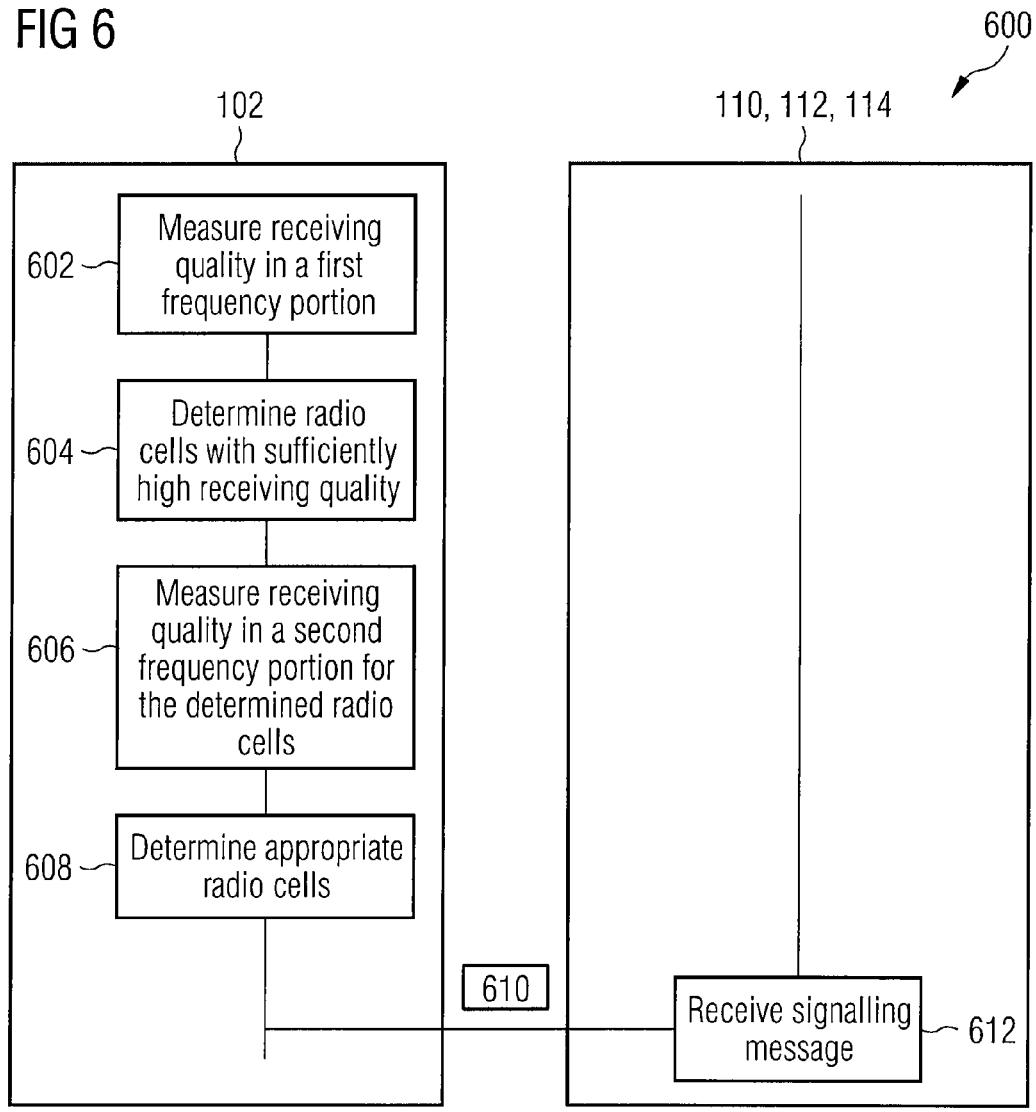
FIG. 6 shows a message flow diagram of a method for determining a receiving quality in a radio communication device in accordance with an embodiment of the invention.

FIG. 6 shows a message flow diagram 600 of a method for determining a receiving quality of adjacent radio cells in a radio communication device in accordance with an embodiment of the invention.

In 602, the UE 102 measures the receiving quality of the downlink reference signals (e.g. of the reference signals 412, 516), which are positioned in a first frequency portion (e.g. in the core region) of the frequency spectrum. In an embodiment of the invention, the first frequency portion may be the frequency portion that is positioned around the carrier frequency in the smallest possible bandwidth in accordance with the respective communication system. It should be understood, that in an alternative embodiment of the invention, the first frequency portion may also be a larger or a smaller frequency region than the one mentioned above. Using the first frequency portion for a first measurement has the effect that the UE 102 obtains the receiving quality for all possible communication system bandwidths (in an embodiment of the invention, this expression refers to the entire frequency region that is used by a radio cell) using the same measuring procedure. Furthermore, the receiving quality of all receivable radio cells, which use e.g. the same carrier frequency, may thus be simultaneously measured independent from the used communication system bandwidth. This saves time and preserves the battery of the UE 102.

In 604, those radio cells, the received signals of which have a sufficiently high receiving quality, are determined.

Then, in 606, the UE 102 carries out a second measurement for those radio cells, for which in 604 it has been determined that their received signals have a sufficiently high receiving quality. In an embodiment of the invention, the second measurement is carried out in a second frequency portion, which may have a larger bandwidth (in other words, the bandwidth is increased) compared with the first frequency portion used in the first measurement. In an embodiment of the invention, the receiving quality is determined in the second measurement using reference signals that are transmitted in a larger bandwidth (compared with the first frequency portion) or in the entire bandwidth.

The measurement results may be evaluated separately for each frequency band portion. In an embodiment of the invention, the number of frequency band portions of each radio cell is determined, the receiving quality of which is higher than or equal to a pre-defined threshold. In case in 604 no radio cell has been determined (in other words, in case that all received signals show a too small receiving quality (e.g. a receiving quality that is smaller than the pre-defined threshold)), the second measurement is not carried out. This preserves the battery of the UE 102. In this case, in an embodiment of the invention, no appropriate radio cell can currently be determined.

In 608, the appropriate radio cells are determined. In an embodiment of the invention, those radio cells out of the radio cells for which the second measurement has been carried out may be considered as an appropriate radio cell, for which the number of frequency band portions having a receiving quality higher than or equal to the pre-defined threshold, is higher than or equal to the number of frequency band portions currently used by the UE 102. In other words, in an embodiment of the invention, radio cells having a sufficiently high receiving quality in a sufficiently large bandwidth are considered to be appropriate.

In an embodiment of the invention, only the determined appropriate radio cells are signalled to the radio communication network, e.g. to the base stations 110, 112, 114, e.g. in a signalling message 610. This significantly reduces the amount of signalling to a very small amount.

In an embodiment of the invention, in 612, the radio communication network, e.g. the base stations 110, 112, 114 receives the signalling message and e.g. the associated radio network controller (not shown) controls the radio communication network, e.g. the base stations 110, 112, 114 in accordance with the appropriate radio cells as signalled in the signalling message 610.

It should be understood that this procedure may be iteratively repeated in more than two stages using e.g. a plurality of pre-defined thresholds and varying (e.g. for each stage monotonically increasing) bandwidths.

In more detail, this embodiment of the invention provides one or more of the following characteristics.

1) The measurement is divided into two or more measurements using different bandwidths, wherein the first measurement may be carried out using a smaller bandwidth, e.g. as small as the smallest bandwidth occurring in the communication system or as small as a pre-defined initial bandwidth as a start value.

2) In an embodiment of the invention, the bandwidth, a communication terminal such as e.g. the UTE 102 should use for a measurement of the reference signals, may be signalled (e.g. by the communication network).

3) A second measurement may be carried out for a radio cell for which the first measurement resulted in a sufficiently high receiving quality. In this case, the number of appropriate frequency band portions (or the bandwidth) is determined, i.e. it is determined how many frequency band portions have a receiving quality higher than or equal to a pre-defined threshold.

4) In an embodiment of the invention, the suitability of a radio cell is evaluated based on the number of appropriate frequency band portions (or the appropriate bandwidth).

5) In an embodiment of the invention, the appropriate radio cells are signalled to the mobile radio communication network. In this embodiment, a signalling of the measured signal quantities in detail is not necessary.

Figure 7:
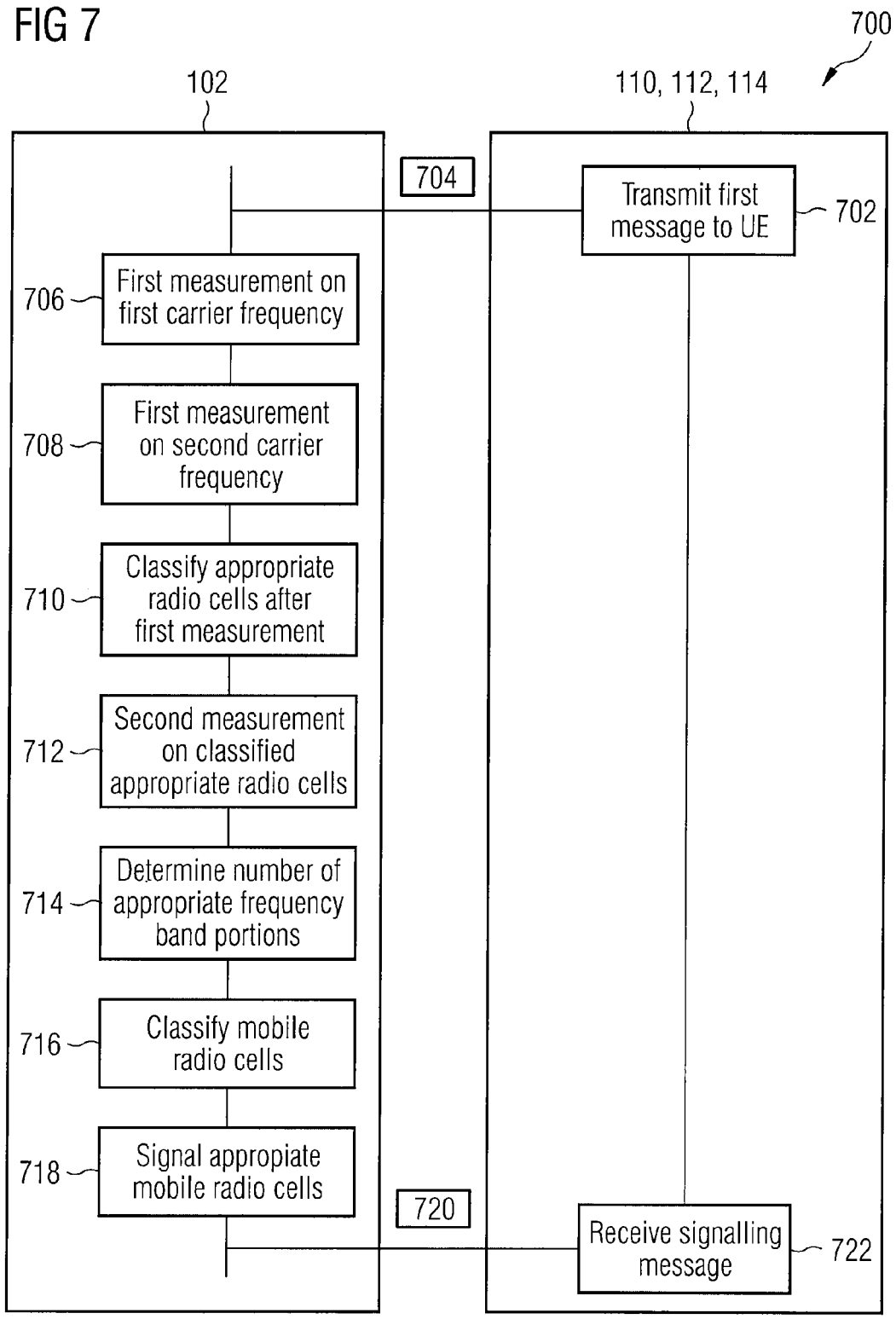
FIG. 7 shows a message flow diagram of a method for determining a receiving quality in a radio communication device in accordance with an embodiment of the invention.

FIG. 7 shows a message flow diagram 700 of a method for determining a receiving quality in a radio communication device in accordance with an embodiment of the invention.

In this embodiment it is assumed that the received power of pre-defined signals is measured and is used for the decision regarding the suitability of radio cells. This embodiment, however, may also be applied if in an alternative embodiment the ratio of the received power of pre-defined signals and the received noise power in the same frequency band is used.

This embodiment is described also with reference to FIG. 1. In an embodiment of the invention, the method for measuring the received signal strength in order to determine an appropriate mobile radio cell is as follows:

In 702, the mobile radio communication network transmits a first message 704 to the UE 102. With the first message 704, the mobile radio communication network requests the UE 102 to measure the signal strength of signals received from neighbouring mobile radio cells. In an embodiment of the invention, the first message 704 includes a list of the mobile radio cells to be measured (e.g. the so-called cell IDs) and for each mobile radio cell e.g. the carrier frequency used by the respective mobile radio cell, the bandwidth to be used for a second measurement, and identifications of the used codes for the synchronization signals and reference signals. In an embodiment of the invention, the first message 704 includes for each mobile radio cell to be measured at least one bandwidth to be used for the first measurement and/or the second measurement. In an alternative embodiment of the invention, any other suitable information may be included in the first message 704. Furthermore, the first message 704 may be split in a plurality of messages so that the above mentioned information may be transmitted to the UE 102 using a plurality of messages.

After having received the first message 704, in an embodiment of the invention, in 706, the UE 102 first measures on the first carrier frequency $f_1$ in a time slot, in which the P-SCH and the S-SCH are transmitted, the power of these received synchronization signals and the power of the reference signals, which are located in the six resource blocks around the first carrier frequency $f_1$.

Figure 8:
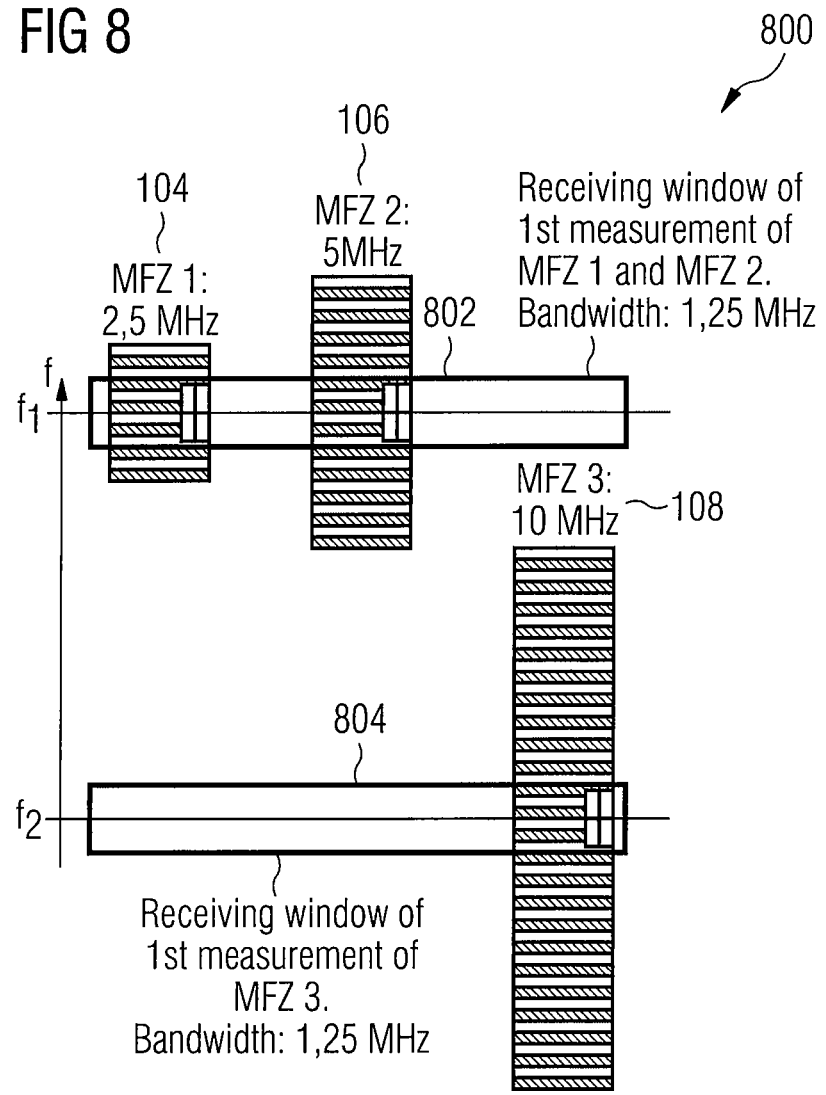
FIG. 8 shows a diagram illustrating a receiving window for a first measurement in a radio communication device in accordance with an embodiment of the invention.

The position of the receiving window 802 for the first measurement on the first carrier frequency $f_1$ is shown in a diagram 800 in FIG. 8. In an embodiment of the invention, the UE 102 uses the codes from the previously received message (e.g. the first message 704) for correlation in the receiver. Thus, first, the receiving power of all mobile radio cells is measured, which, according to the first message 704, for example, transmit on the first carrier frequency $f_1$.

Subsequently, in 708, the same measurement with a receiving window 804 of the same size is carried out on the second carrier frequency $f_2$. The measured values from each mobile radio cell are collected and optionally combined to one or more values. In an embodiment of the invention, the statistical average from the collected values is determined for each mobile radio cell.

Then, the UE 102 compares the combined values (or in an alternative embodiment of the invention, all the collected values) with a pre-defined threshold value. Mobile radio cells, the receiving power of which are below the pre-defined threshold value are classified as inappropriate. As an example, measurement results of the first measurement are shown in the following table 1:

TABLE 1

| Node B | MFZ 1 104 | MFZ 2 106 | MFZ 3 108 |
| --- | --- | --- | --- |
| Measured power | −60 dBm | −65 dBm | −80 dBm |
| Appropriate? (>−70 dBm) | Yes | Yes | No |

In this embodiment, it is assumed that a mobile radio cell is classified as appropriate in case the receiving power is higher than −70 dBm. In this example, in 710, the first mobile radio cell MFZ 1 104 and the second mobile radio cell MFZ 2 106 are classified as appropriate mobile radio cells since the measured power is above the pre-defined threshold value, respectively.

Figure 9:
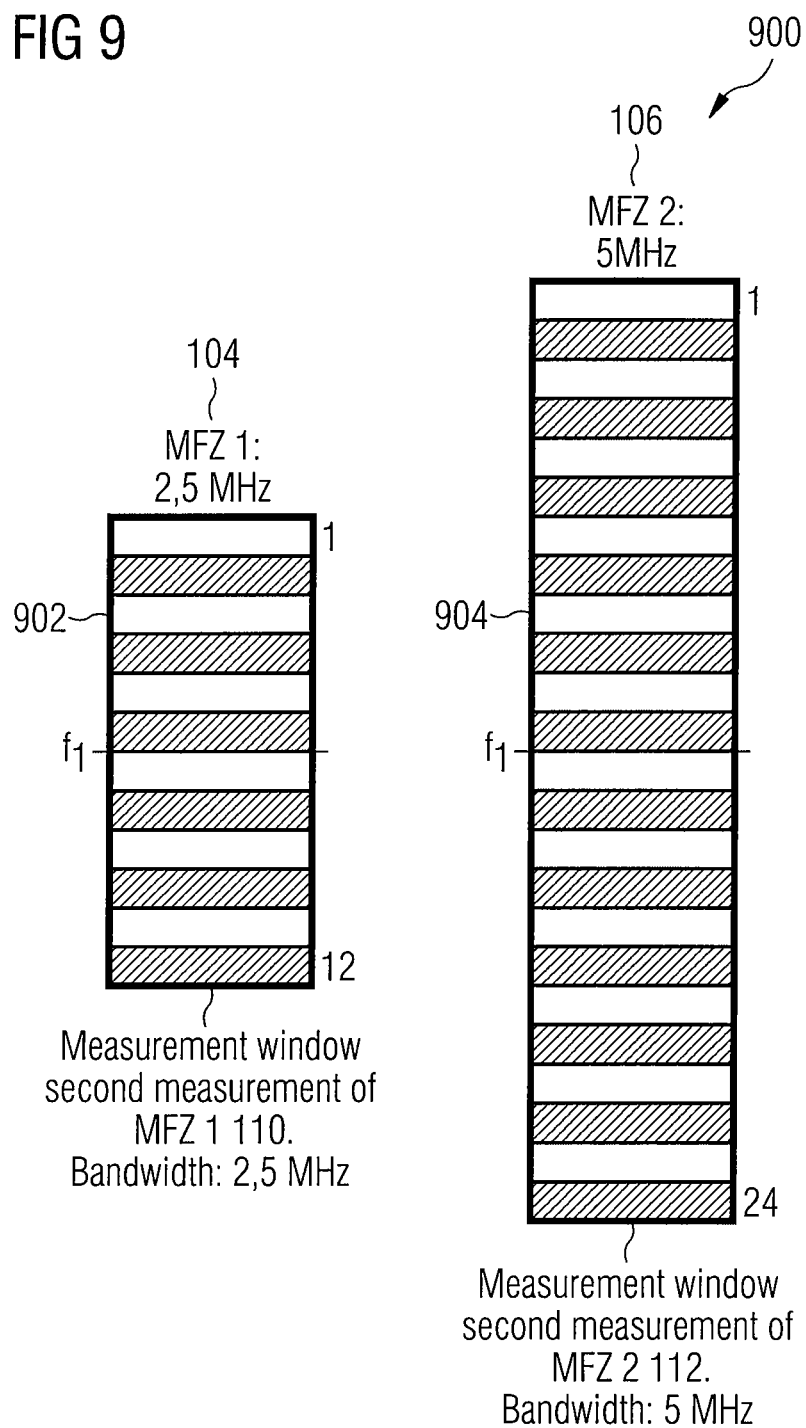
FIG. 9 shows a diagram illustrating a receiving window for a second measurement in a radio communication device in accordance with an embodiment of the invention.

For the remaining mobile radio cells (e.g. for the first mobile radio cell MFZ 1 104 and the second mobile radio cell MFZ 2 106) a respective second measurement is carried out in 712. In an embodiment of the invention, the bandwidth signalled to the UE 102 (e.g. using the first message 704) is used for the second measurement. The power of all received reference symbols is measured within other receiving windows 902, 904 as shown in a diagram 900 in FIG. 9. FIG. 9 illustrates the position of the other receiving windows 902, 904 for these second measurements. The other receiving windows 902, 904 are adjusted to the respective bandwidth which has been signalled to the UE 102, e.g. using the first message 704. In this embodiment of the invention, the other receiving windows 902, 904 are adjusted to the respective system bandwidth of the respective mobile radio cell. Thus, a first other receiving window 902 is adjusted to the system bandwidth of the first mobile radio cell 104 and the second other receiving window 904 is adjusted to the system bandwidth of the second mobile radio cell 106.

The received powers of the four reference symbols of a resource block are combined, respectively. The measurement results of the first mobile radio cell MFZ 1 104 are illustrated in the following table 2 in an exemplary manner.

TABLE 2

| | IDs of the resource blocks | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Measured powers of MFZ1 104 [dBm] | −75 | −73 | −71 | −69 | −62 | −55 | −53 | −57 | −65 | −71 | −75 | −77 |
| Appropriate? (>−70 dBm) | No | No | No | Yes | Yes | Yes | Yes | Yes | Yes | No | No | No |

As is shown in Table 2, in this example, six resource blocks (resource blocks number 4, 5, 6, 7, 8, 9) of the first mobile radio cell MFZ 1 104 are classified as appropriate since they are above the pre-defined threshold value of −70 dBm.

Furthermore, the measurement results of the second mobile radio cell MFZ 2 106 are illustrated in the following table 3 in an exemplary manner.

TABLE 3

| | IDs of the resource blocks | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Measured powers of MFZ2 106 [dBm] | −72 | −73 | −74 | −75 | −76 | −75 | −74 | −73 | −72 | −71 | −65 | −55 |
| Appropriate? (>−70 dBm) | No | No | No | No | No | No | No | No | No | No | Yes | Yes |
| | IDs of the resource blocks | | | | | | | | | | | |
| | 13 | 14 | 15 | 16 | 17 | 18 | 19 | 20 | 21 | 22 | 23 | 24 |
| Measured powers of MFZ2 106 [dBm] | −65 | −71 | −72 | −73 | −74 | −75 | −76 | −75 | −74 | −73 | −72 | −71 |
| Appropriate? (>−70 dBm) | Yes | No | No | No | No | No | No | No | No | No | No | No |

As is shown in Table 3, in this example, three resource blocks (resource blocks number 11, 12, 13) of the second mobile radio cell MFZ 2 106 are classified as appropriate since they are above the pre-defined threshold value of −70 dBm.

The UE 102 then, in 714, counts, for each mobile radio cell, the number of the frequency band portions, which are above the pre-defined threshold value of −70 dBm. As mentioned above, for the first mobile radio cell MFZ 1 104, there are six resource blocks classified as appropriate and for the second mobile radio cell MFZ 2 106, there are three resource blocks classified as appropriate.

In 716, the mobile radio cells are classified. In an embodiment of the invention, a mobile radio cell is classified as inappropriate if the number of frequency portions (e.g. resource blocks) received with powers higher than the pre-defined threshold value is smaller than the number of resource blocks that are currently used by the UE 102. In an embodiment of the invention, it is assumed that the UE 102 currently uses five resource blocks. Therefore, in this embodiment, only the first mobile radio cell MFZ 1 104 is classified as an appropriate mobile radio cell (having six appropriate resource blocks) and the second mobile radio cell MFZ 2 106 is classified as an inappropriate mobile radio cell (having only three appropriate resource blocks).

Then, in 718, the mobile radio cell(s) which is/are classified as being appropriate (in the above described example the first mobile radio cell MFZ 1 104) is/are signalled to the mobile radio communication network as being appropriate mobile radio cells. To do this, in an embodiment of the invention, a second message 720 is generated from the UE 102, wherein the second message 720 includes the indices uniquely representing the appropriate mobile radio cell. The second message 720 is then transmitted from the LUE 102 to the mobile radio communication network, e.g. via the base stations 110, 112, 114. In an embodiment of the invention, the cell ID of the first mobile radio cell MFZ 1 104 is signalled in the second message 720.

After having received the second message 720 (which is also referred to as signalling message), the mobile radio communication network (e.g. the radio network controller (RNC)) may use this information about appropriate mobile radio cells for a change of the current serving cell (not shown) of UE 102 to the first mobile radio cell MFZ 1 104 (which is also referred to as handover).

Figure 10:
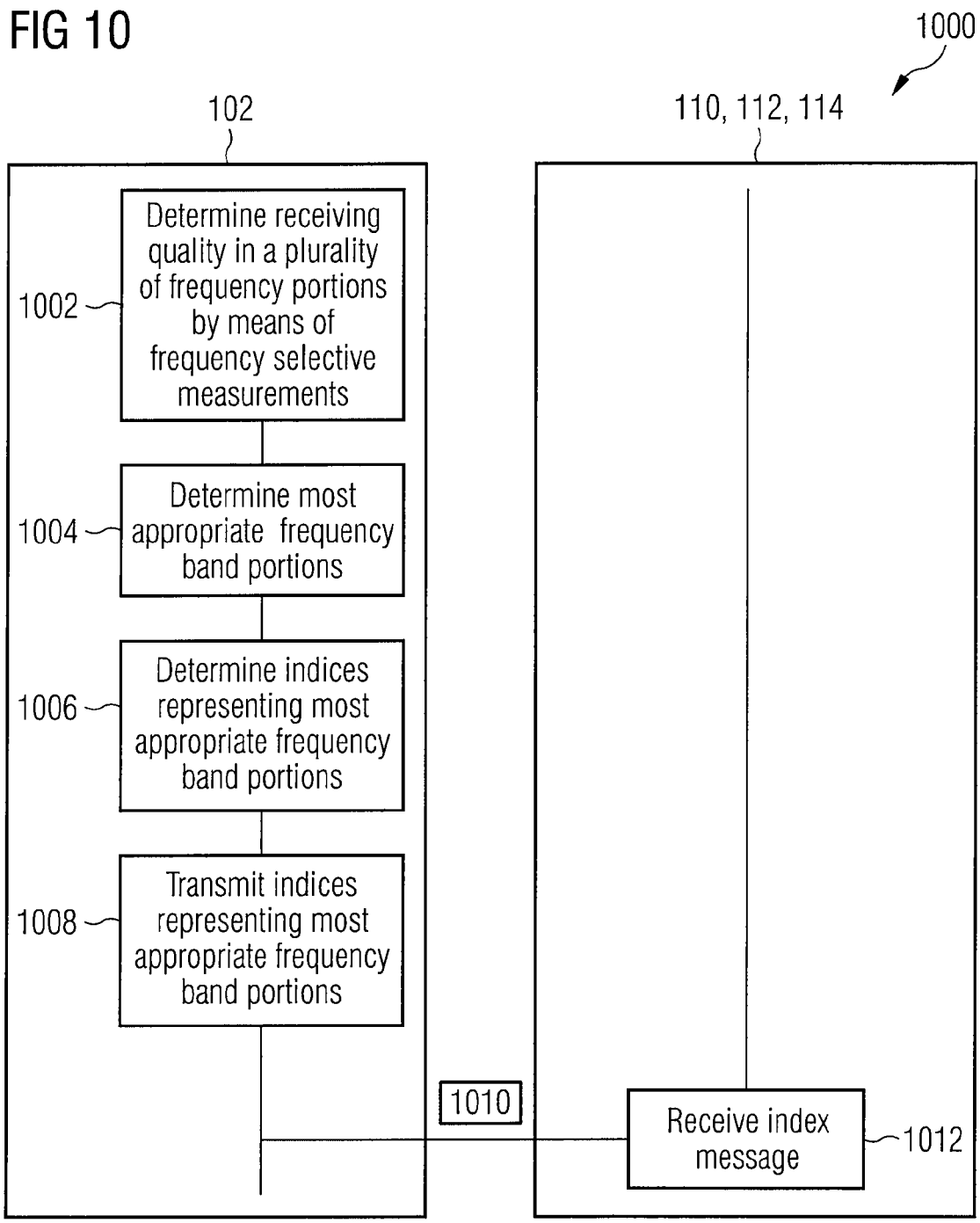
FIG. 10 shows a message flow diagram of a method for signalling of frequency band measurements in a mobile radio cell in accordance with an embodiment of the invention.

FIG. 10 shows a message flow diagram 1000 of a method for signalling of frequency band measurements in a mobile radio cell in accordance with an embodiment of the invention.

For the case that the UE 102 has established a communication connection to a mobile radio cell und that measurements from this mobile radio cell are required in order to determine the frequency band portions which are most appropriate for data transmission, the following method is provided in accordance with an embodiment of the invention.

In 1002, the UE 102 determines the receiving quality of reference signals in a plurality of frequency band portions or in all frequency band portions of the received signals, by means of frequency selective measurements, i.e. the UE 102 determines the receiving quality separately in a plurality of frequency band portions. In an embodiment of the invention, the number of measured frequency band portions may be dependent from the bandwidth requirement of the UE 102, in other words, dependent from the used service, e.g. from the used communication service.

Using the measurement results in the determination of the receiving quality in 1002, in 1004, the UE 102 determines the frequency band portions which are most appropriate, in other words, the frequency band portions having the highest receiving quality, e.g. the three "best" (most appropriate) frequency band portions (in an alternative embodiment of the invention, the four, five, six, seven, eight, . . . best frequency band portions). In an embodiment of the invention, the number of determined "best" (most appropriate) frequency band portions may be dependent from the bandwidth requirement of the UE 102.

Then, in 1006, the UE 102 determines indices uniquely representing the determined "best" (most appropriate) frequency band portions.

Then, in 1008, the UE 102 transmits the indices uniquely representing the determined "best" (most appropriate) frequency band portions in an index message 1010 to the mobile radio communication network.

After having received the index message 1010 in 1012, the mobile radio communication network (e.g. the radio network controller (RNC)) may decide which frequency band portions it assigns to the UE 102 for data transmission.

The above-described embodiment needs only a very low signalling expense.

In order to select appropriate frequency band portions, the following procedures may be provided in accordance with an embodiment of the invention:

1) A UE determines the receiving quality of a mobile radio cell of more than one frequency band portion.
2) The "n" strongest frequency band portions are signalled to the mobile radio communication network, wherein "n" is greater than or equal to the number of frequency band portions (or bandwidth) that is currently used by the UE.

Figure 11:
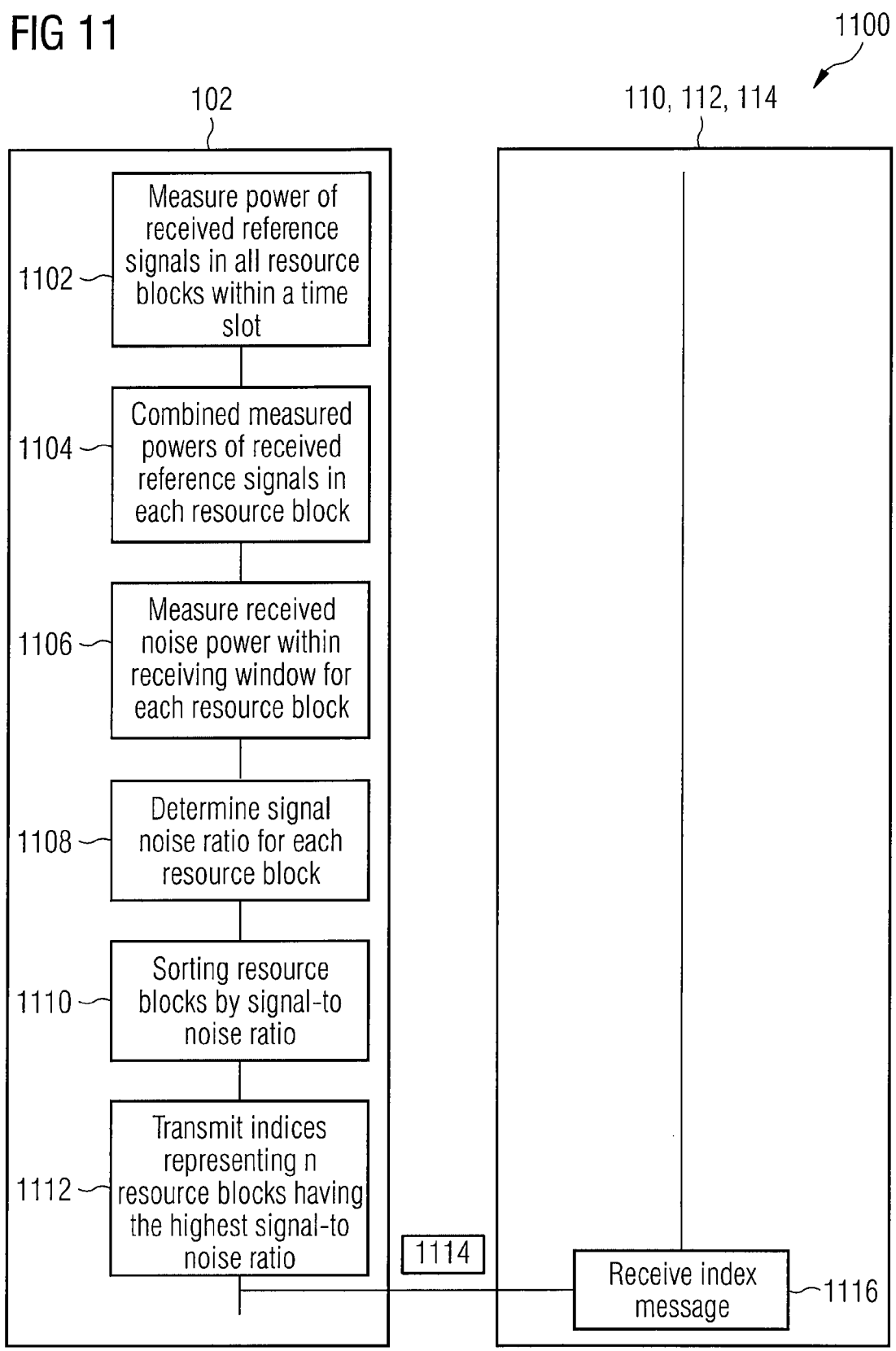
FIG. 11 shows a message flow diagram of a method for signalling of frequency band measurements in a mobile radio cell in accordance with an embodiment of the invention.

FIG. 11 shows a message flow diagram 1100 of a method for signalling of frequency band measurements in a mobile radio cell in accordance with an embodiment of the invention. The embodiment described in the following illustrates the measuring of a currently used cell (serving cell).

This embodiment of the invention starts from the assumption (without limiting the general applicability) that the ratio of the received power of pre-defined signals and the noise power received in the same frequency band is used for the decision as to whether the frequency band portions can be used or not. However, the embodiment is also applicable in the case that instead of the mentioned ratio, the received power of pre-defined signals is used.

In an embodiment of the invention, it is assumed that the UE 102 is currently connected to the first mobile radio cell MFZ 1 104. In the following, the procedure of the measurement of the downlink signals (e.g. the procedure of the measurement of the LTE downlink signals) in order to find the most appropriate frequency band portions and to inform the mobile radio communication network about them, will be described in more detail.

In 1102, the UE 102 measures the power of the received reference symbols in all resource blocks within a time slot, i.e. over the entire system bandwidth. The position of the receiving window 1202 for the measurement is shown in a diagram 1200 in FIG. 12. As shown in FIG. 12, the receiving power is determined for each resource block separately.

Then, optionally, in 1104, the measured powers of the received four reference symbols of a resource block are respectively combined. In an embodiment of the invention, the statistical average from the measured powers of the received four reference symbols is determined for each resource block.

Then, in 1106, the UE 102 measures the received noise power within the receiving window 1202 for each resource block.

Subsequently, in 1108, the UE 102 determines the signal-to-noise ratio for each resource block, i.e. the UE 102 determines the quotient of the measured power of the reference signals and the measured noise power.

Then, in 1110, the frequency band portions, in which the signal-to-noise ratio is higher than a pre-defined signal-to-noise threshold value, are sorted by their amount of the signal-to-noise ratio. The sorted measurement results are illustrated in the following table 4:

TABLE 4

|  | IDs of the resource blocks | | | | | | | | | | | |
| --- | --- | --- | --- | --- | --- | --- | --- | --- | --- | --- | --- | --- |
|  | 7 | 6 | 8 | 5 | 9 | 4 | 3 | 10 | 2 | 11 | 1 | 12 |
| Measured signal-to-noise ratio of MFZ1 [dB], sorted by amount | 11 | 10 | 8 | 3 | 0 | −4 | −6 | −7 | −8 | −10 | −11 | −12 |
| Higher than signal-to-noise threshold value? (>−5 dB) | Yes | Yes | Yes | Yes | Yes | Yes | No | No | No | No | No | No |

As shown in table 4, the measurement results are sorted by the amount of the measured signal-to-noise ratio. In this example, six resource blocks have a signal-to-noise ratio that is higher than the signal-to-noise threshold value of −5 dB. The indices of the four strongest frequency band portions are marked (printed in bold letters and underlined) in table 4 (frequency band portions 7, 6, 8, 5) are signalled to the mobile radio communication network, as will be described in more detail below.

In 1112, the indices of the n (n being an arbitrarily settable number) frequency band portions (e.g. resource blocks) having the highest signal-to-noise ratios are transmitted to the mobile radio communication network. In an embodiment of the invention, an index message 1114 is generated including the mentioned indices and is transmitted from the UE 102 to the mobile radio communication network. In an embodiment of the invention, the number of indices may be dependent from the number of the resource block currently used by the UE 102. In an embodiment of the invention, it may be provided that more indices are signalled to the mobile radio communication network than are currently used by the UE 102.

Thus, after having received the index message 1114 in 1116, the mobile radio communication network may select, which resource blocks it will assign to the UE 102. In this example, the UE 102 uses two resource blocks. The four best resource blocks are signalled (in this example the resource blocks number 7, 6, 8, and 5), i.e. two resource blocks more than necessary. Thus, the mobile radio communication network has the option to select two resource blocks of the four resource blocks by itself and assign them to the UE 102.

In order to determine the bandwidth, which a communication terminal device such as e.g. a LTE should use for measuring the downlink reference signal (e.g. the LTE downlink reference signal), in various embodiments of the invention, one or more of the following methods may be used.

1) The bandwidth may be explicitly signalled from the mobile radio communication network to the UE, e.g. in a message, which requests a UE to measure neighbour cells (e.g. a "Measurement control" message). This message is transmitted from the mobile radio communication network to the UE and may, in accordance with an embodiment of the invention, include, in addition to an identification of the neighbour cell to be measured, also the bandwidth of the downlink reference signal to be measured. By doing this, the UE knows the bandwidth even before the measurement and therefore, the measurement can be carried out faster. Furthermore, a bandwidth can be individually signalled to each UE.

2) The bandwidth may be implicitly signalled. In this case, in an embodiment of the invention, definite signals, which the mobile radio cell to be measured transmits, include the information with which bandwidth the downlink reference signal should be measured, e.g. in the synchronization signals (P-SCH and/or S-SCH) and/or in the reference signals and/or via the broadcast channel (BCH). This method makes it possible to inform a very large number of UEs about the bandwidth to be used without having to send this information to each UE separately.

3) The bandwidth determination by blind decoding. In accordance with this method, no specific signals are transmitted for signalling of the bandwidth. The UE increases the bandwidth for measuring the downlink reference signal stepwise, beginning with the smallest possible bandwidth or with a pre-defined start bandwidth value. In case a bandwidth increase does not result in new signals to be measured, in other words, does not include signals which fit for the correlation codes used for the measurement, the measurement method will be stopped. In this method, there is no need for any signalling.

In an embodiment of the invention, methods for selecting appropriate radio cells and appropriate frequency band portions are provided based on the receiving quality of received signals, and methods for signalling the results to a mobile radio communication network in a mobile radio communication system having scalable system bandwidths and flexible assignment of frequency band portions.

In an embodiment of the invention, methods are provided, which make it possible to carry out required measurements e.g. in LTE, taking specifically into account the scalable bandwidths, effectively and fast.

FIG. 13 shows a message flow diagram 1300 of a method for determining a receiving quality in a radio communication device in accordance with an embodiment of the invention.

In 1302, radio signals are received.

Then, in 1304, the receiving quality of received radio signals is measured, wherein a first measurement is carried out using a first frequency bandwidth, thereby determining a first receiving quality, and if the determined first receiving quality fulfills a first receiving quality criterion, a second measurement is carried out using a second frequency bandwidth, wherein the second frequency bandwidth is larger than the first frequency bandwidth, thereby determining a second receiving quality.

In an embodiment of the invention, the first measurement may be carried out for a plurality of radio cells. Furthermore, the first measurement may be carried out for a plurality of carrier frequencies such that each first measurement is carried out using the first frequency bandwidth around the respective carrier frequency of the plurality of carrier frequencies. In an embodiment of the invention, the signals are received in accordance with a multi-carrier mobile radio communication transmission, e.g. in accordance with a multi-carrier Frequency Division Multiple Access mobile radio communication transmission, e.g. in accordance with a multi-carrier Orthogonal Frequency Division Multiple Access mobile radio communication transmission. In an embodiment of the invention, the signals are received in accordance with a Third Generation Partnership Project communication standard, e.g. in accordance with a Universal Mobile Telecommunications System communication standard.

FIG. 14 shows a message flow diagram 1400 of a method for signalling of frequency band measurements in a mobile radio cell in accordance with an embodiment of the invention.

In 1402, radio signals are received.

In 1404, the receiving quality of received radio signals is measured.

In 1406, a plurality of frequency band portions which fulfill a predefined frequency band portion receiving quality criterion are determined.

In 1408, each of the determined frequency band portions is mapped on a respective frequency band portion index representing the respectively determined frequency band portion.

In 1410, the frequency band portion indices representing the determined frequency band portions are transmitted to a communication device.

In an embodiment of the invention, a predetermined number of frequency band portions are determined in which the received radio signals show the highest receiving quality.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A radio communication device, comprising:
a receiver configured to receive radio signals;
a measurement circuit configured to measure the receiving quality of received radio signals;
a determination circuit configured to determine a first frequency bandwidth using at least one of the following mechanisms:
a received bandwidth signaling message;
implicit signaling; and
blind decoding; and
a controller configured to control the measurement circuit such that a first measurement is carried out using the determined first frequency bandwidth, thereby determining a first receiving quality;
wherein the determination circuit is further configured to determine a second frequency bandwidth using at least one of the following mechanisms:
a received bandwidth signaling message;
implicit signaling; and
blind decoding; and
wherein the controller is further configured to control the measurement circuit such that:
a second measurement is carried out using the determined second frequency bandwidth, if the determined first receiving quality fulfills a first receiving quality criterion, wherein the second frequency bandwidth is larger than the first frequency bandwidth, thereby determining a second receiving quality,
the first measurement is carried out for a plurality of carrier frequencies such that each first measurement is carried out using the first frequency bandwidth around the respective carrier frequency of the plurality of carrier frequencies,
the second measurement is carried out for a plurality of frequency band portions,
it is determined how many frequency band portions fulfill a predefined frequency band portion receiving quality criterion, and
the radio cell from which the radio signals have been received is evaluated based on how many frequency band portions fulfill the predefined frequency band portion receiving quality criterion.

2. The radio communication device of claim 1,
wherein the controller is configured to control the measurement circuit such that the first measurement is carried out for a plurality of radio cells.

3. The radio communication device of claim 1,
being configured as a mobile radio communication device.

4. The radio communication device of claim 3,
being configured as a mobile radio communication terminal device.

5. The radio communication device of claim 3,
being configured as a multi-carrier mobile radio communication device.

6. The radio communication device of claim 5,
being configured as a multi-carrier Frequency Division Multiple Access mobile radio communication device.

7. The radio communication device of claim 6,
being configured as an Orthogonal Frequency Division Multiple Access mobile radio communication device.

8. The radio communication device of claim 3,
being configured as a mobile radio communication device in accordance with a Third Generation Partnership Project communication standard.

9. The radio communication device of claim 8,
being configured as a mobile radio communication device in accordance with a Universal Mobile Telecommunications System communication standard.

10. The radio communication device of claim 1, further comprising:
a transmitter configured to transmit an information about the measurement result to a further communication device.

11. The radio communication device of claim 10,
wherein the further communication device is a network communication device.

12. The radio communication device of claim 11,
wherein the information about the measurement result is an index information indicating a radio cell, the measurement result is associated with.

13. The radio communication device of claim 1,
wherein the determined frequency bandwidth is smaller than the system bandwidth.

14. A method for determining a receiving quality in a radio communication device, the method comprising:
receiving radio signals;
determining a first frequency bandwidth using at least one of the following mechanisms:
a received bandwidth signaling message;
implicit signaling; and
blind decoding; and
carrying out a first measurement using the determined first frequency bandwidth, thereby determining a first receiving quality;
determining a second frequency bandwidth using at least one of the following mechanisms:
a received bandwidth signaling message;
implicit signaling; and
blind decoding;
carrying out a second measurement using the determined second frequency bandwidth, if the determined first receiving quality fulfills a first receiving quality criterion, wherein the second frequency bandwidth is larger than the first frequency bandwidth, thereby determining a second receiving quality,
carrying out the first measurement for a plurality of carrier frequencies such that each first measurement is carried out using the first frequency bandwidth around the respective carrier frequency of the plurality of carrier frequencies,
carrying out the second measurement for a plurality of frequency band portions,
determining how many frequency band portions fulfill a predefined frequency band portion receiving quality criterion, and
evaluating the radio cell from which the radio signals have been received based on how many frequency band portions fulfill the predefined frequency band portion receiving quality criterion.

15. The method of claim 14,
wherein the measurement is carried out for a plurality of radio cells.

16. The method of claim 14,
wherein the signals are received in accordance with a multi-carrier mobile radio communication transmission.

17. The method of claim 16,
wherein the signals are received in accordance with a multi-carrier Frequency Division Multiple Access mobile radio communication transmission.

18. The method of claim 17,
wherein the signals are received in accordance with a Orthogonal Frequency Division Multiple Access mobile radio communication transmission.

19. The method of claim 14,
wherein the signals are received in accordance with a Third Generation Partnership Project communication standard.

20. The method of claim 19,
wherein the signals are received in accordance with a Universal Mobile Telecommunications System communication standard.

21. The method of claim 14, wherein the determined frequency bandwidth is smaller than the system bandwidth.

22. A radio communication device, comprising:
a receiving means for receiving radio signals;
a measuring means for measuring the receiving quality of received radio signals;
a determination means for determining a frequency bandwidth using at least one of the following mechanisms:
a received bandwidth signaling message;
implicit signaling; and
blind decoding; and
a control means for controlling the measuring means such that a measurement is carried out using the determined frequency bandwidth, thereby determining a receiving quality;
the determination means further for determining a second frequency bandwidth using at least one of the following mechanisms:
a received bandwidth signaling message;
implicit signaling; and
blind decoding; and
the control means further for controlling the measurement circuit such that:
a second measurement is carried out using the determined second frequency bandwidth, if the determined first receiving quality fulfills a first receiving quality criterion, wherein the second frequency bandwidth is larger than the first frequency bandwidth, thereby determining a second receiving quality,
the first measurement is carried out for a plurality of carrier frequencies such that each first measurement is carried out using the first frequency bandwidth around the respective carrier frequency of the plurality of carrier frequencies,
the second measurement is carried out for a plurality of frequency band portions,
it is determined how many frequency band portions fulfill a predefined frequency band portion receiving quality criterion, and
the radio cell from which the radio signals have been received is evaluated based on how many frequency band portions fulfill the predefined frequency band portion receiving quality criterion.

* * * * *